(12) United States Patent
Doujak et al.

(10) Patent No.: US 9,238,234 B2
(45) Date of Patent: Jan. 19, 2016

(54) DEVICE AND METHOD FOR REMOVING SUSPENDED-MATERIAL PARTICLES

(75) Inventors: Eduard Doujak, Vienna (AT); Bernd Windholz, Margarethen am Moos (AT); Leopold Binder, Vienna (AT)

(73) Assignee: TECHNISCHE UNIVERSITAT WIEN, Vienna (AT)

( * ) Notice: Subject to any disclaimer, the term of this patent is extended or adjusted under 35 U.S.C. 154(b) by 737 days.

(21) Appl. No.: 13/574,166

(22) PCT Filed: Jan. 19, 2011

(86) PCT No.: PCT/AT2011/000033
§ 371 (c)(1),
(2), (4) Date: Jul. 19, 2012

(87) PCT Pub. No.: WO2011/088491
PCT Pub. Date: Jul. 28, 2011

(65) Prior Publication Data
US 2012/0292264 A1 Nov. 22, 2012

(30) Foreign Application Priority Data
Jan. 19, 2010 (AT) .................................. A 65/2010

(51) Int. Cl.
*B04C 3/00* (2006.01)
*B04C 3/06* (2006.01)
*B01D 21/26* (2006.01)
*C02F 1/38* (2006.01)
*E01B 9/06* (2006.01)
*F03B 11/00* (2006.01)
*F03B 3/18* (2006.01)
*E02B 9/06* (2006.01)

(52) U.S. Cl.
CPC ................ *B04C 3/00* (2013.01); *B01D 21/267* (2013.01); *B04C 3/06* (2013.01); *C02F 1/38* (2013.01);
(Continued)

(58) Field of Classification Search
CPC ...... B04C 3/00; B04C 3/06; B04C 2003/006; B01D 21/267; C02F 1/38; E02B 9/06; F03B 11/00; F03B 3/18; F05B 2260/63; Y02E 10/226

IPC ........ B04C 3/00,3/06, 2003/006; B01D 21/267; C02F 1/38; E02B 9/06; F03B 11/00, 3/18; F05B 2260/63; Y02E 10/226
See application file for complete search history.

(56) References Cited

U.S. PATENT DOCUMENTS 4,127,396 A 11/1978 Tortorici et al. ................. 55/396
6,666,338 B1 12/2003 Henriksson et al. .......... 209/725
(Continued)

FOREIGN PATENT DOCUMENTS

CA 2 671 216 1/2010
DE 3 8337 789 5/1990
(Continued)

OTHER PUBLICATIONS

International Search Report and Written Opinion issued in PCT Application No. PCT/AT2011/000033, mailed May 23, 2011. (Translation).
(Continued)

*Primary Examiner* — David A Reifsnyder
(74) *Attorney, Agent, or Firm* — Norton Rose Fulbright US LLP

(57) ABSTRACT

Device (5) and method or removing suspended-material particles, more particularly fine and ultra-fine particles from a water flow containing suspended-material particles in a pressurised water line (3) of a hydroelectric power plant (2), whereby a tubular element (6) forming a flow channel (7) is provided in the pressurised water line (3), whereby the flow channel (7) essentially extends in the axial direction of the pressurised water line (3), and in the flow channel (7) a stationary swirl-generating device (11) is arranged for stimulating a flow component of the water flow which runs perpendicularly to the main flow direction (9), and in the flow direction after swirl-generating device (11) a separating device (13) is provided for removing the suspended-material particles carried radially outwards due to the effect of centrifugal force.

26 Claims, 9 Drawing Sheets

(52) U.S. Cl.
CPC ... *E02B 9/06* (2013.01); *F03B 3/18* (2013.01); *F03B 11/00* (2013.01); *B04C 2003/006* (2013.01); *F05B 2260/63* (2013.01); *Y02E 10/22* (2013.01); *Y02E 10/223* (2013.01); *Y02E 10/226* (2013.01)

(56) References Cited

U.S. PATENT DOCUMENTS

| 8,182,674 | B2* | 5/2012 | Prigent | 210/512.1 |
| 2002/0030011 | A1 | 3/2002 | Constantine et al. | 210/512.1 |
| 2006/0182630 | A1 | 8/2006 | Miller et al. | 415/220 |

FOREIGN PATENT DOCUMENTS

| EP | 1 717 373 | 11/2006 |
| JP | 5098624 | 4/1993 |

OTHER PUBLICATIONS

Office Communication issued in Austrian Patent Application No. A 65/2010, dated Jul. 14, 2010.

Pandit, "Hydrocyclones: Alternative Devices for Sediment Handling in ROR Projects", International Conference on Small Hydropower—Hydro Sri Lanka, Oct. 22-24, 2007, pp. 1-10.

* cited by examiner

DEVICE AND METHOD FOR REMOVING SUSPENDED-MATERIAL PARTICLES

This application is a national phase application under 35 U.S.C. §371 of International Application No. PCT/AT2011/000033 filed 19 Jan. 2011, which claims priority to Austrian Application No. A 65/2010 filed 19 Jan. 2010. The entire contents of each of the above-referenced disclosures is specifically incorporated herein by reference without disclaimer.

The present invention relates to a device and a method for removing suspended-material particles, more particularly sand, from a flow of water containing suspended-material particles in a pressurised water line of hydroelectric power plant.

Hydraulic power plants convert the hydraulic energy of a water flow into electrical current. Storage power plants utilise the potential energy of a reservoir of water through accelerating the water along a pressurised water pipeline over a drop height of up to several hundred meter. The kinetic energy of the water flow is converted by turbines into rotational energy and with the aid of generators is made useful as electrical energy. The reservoir of water can contain a larger quantity of sediments or suspended-material particles, i.e. solid materials of different sizes such as silt, sand etc., which reach the power plant via the pressurised water line and cause a high degree of wear, more particularly of the rotating parts of the turbine.

In order to protect sensitive parts of power plants, more particularly the turbine blades, from abrasion through the introduction of suspended-material particles, power stations usually have large settlement basins or de-sanding plants with which it is attempted to remove the suspended-material particles from the water with the aid of sand traps etc. In the sand traps the water flow is calmed and the flow speed reduced, whereby heavier solids such as sand, soil etc. sink and are partially removed. However, in practice is has been shown that in spite of such settlement basins the water flow in the pressurised line continues to have a relatively high content of sand and suchlike. In one particular plant, for example, it was observed that in the case of impellers with an original weight of 780 kg, after approximately 6 months of operation 200 kg had already been worn away due to abrasion by the sediments; even if the wear is less than this, frequent and especially costly replacement of the impellers of a hydraulic power plant is required.

In the publication "Hydrocyclones: Alternative Devices for Sediment Handling in ROR Projects" by H. P. Pandit, International Conference on Small Hydropower—Hydro Sri Lanka, 22-24 Oct. 2007 the utilisation of centrifugal force to separate the suspended-material particles from a water flow in a pressured water line of hydroelectric power plants is described in principle, whereby different tangential cyclones for separating the suspended-material particles from the water flow are proposed. Even though according to the conference report such tangential cyclones are suitable for hydroelectric power plants, such cyclones disadvantageously result in a relatively low degree of efficiency of the power plant.

A similar tangential cyclone with centripetal drawing off of the clean water for sand trapping for small and medium-sized hydroelectric plants is also known from DE 3 8337 789A. However, in practice such tangential cyclones have not proved satisfactory due to the high pressure losses.

In addition, from EP 1 717 373 A2 a power plant intake for a river hydroelectric power plant is known in which in the area of the bed of the power plant intake fluid channels are provided perpendicularly to the flow direction which are supplied with compressed air to loosen solid materials from the bed and return them to the river bed via a flushing water channel.

Accordingly, the known devices for de-sanding pressurised water lines cause an uneconomically high pressure loss in the water flow or have very high structural requirements and are associated with high installation and maintenance costs.

From JP 05-098624 an outlet for a watering line is known. The outlet has a pipe arranged obliquely to the line which brings about swirling of the fluid flow introduced via a slit in order to separate out sediment particles contained in the fluid flow. However this device is not designed for the removal of suspended-material particles from a pressurised water line of a power plant.

US 2006/0182630 A1 describes another type of device for generating electrical energy from a fluid flow. The fluid flow is introduced into a chamber in which an inserted component generates a vortex flow which drives a propeller or suchlike to produce energy.

In contrast to this the aim of the present invention is to create a structurally simple, cost-effective device of the initially described type, with which suspended-material particles can be reliably removed from a pressurised water line with as little pressure loss as possible. After assembly the device should automatically assure de-sanding of the water flow in the pressurised water line with as little maintenance as possible being required.

This is achieved in accordance with the invention in that a tubular element in a flow channel is present in the pressurised water line, wherein the flow channel extends in the axial direction of the pressurised water line and a stationary swirl-generating device is arranged in the flow channel in order to generate a flow component of the water flow which is perpendicular to a main flow direction, and in flow direction after the swirl-generating device a separating device is provided for separating the suspended-material particles carried radially outwards due to the centrifugal force effect.

With the stationary swirl-generating device in the form of an axial cyclone the fluid entering the flow channel, i.e. a preferably circular flow cross-section, in the main flow direction is deflected perpendicularly to the main flow direction so that in addition to a component in the main flow direction, which is determined by the course of the flow channel in the tubular element, the resulting velocity vector of the water flow also has a velocity component perpendicular to the main flow direction. A centrifugal force acts on the swirl-exposed suspended-material particles which is proportional to the mass of the suspended-material particles, the square of their velocity component perpendicular to the main flow direction and indirectly proportional to their radial distance from a middle axis of the flow channel. The centrifugal force brings about a concentration of the suspended-material particles which increases with distance from the middle axis. The suspended-material particles carried outwards can then be removed from the water flow with the separating device. The stationary swirl-generating device in the flow channel exposes the suspended-material particles to swirling by means of the external shape which determines the flow path for the water flowing along the swirl generating device. As the device in accordance with the invention is designed as a section of the pressurised water line, the pressure loss of the water flow and the structural costs can be kept comparatively low; the dimensions of the tubular element are comparable with those of the remainder of the pressurised water line so that a particularly space-saving, structurally simple arrangement can be achieved. To stimulate the flow component perpendicular to the main flow direction no active devices, such as rotor blades or suchlike, are required which reduces the susceptibility to wear as well as the cost of maintenance considerably.

Particularly in the case of power plants with a high output the pressurised water line can have at least two sections with different gradients. In order to keep the pressure loss in the pressurised water line to a minimum when flowing through the de-sanding device it is beneficial if the tubular element is provided in a section with a comparatively small gradient. Accordingly, the suspended-material particles are removed in a flat part of the line, whereby only a small proportion of the flow energy is lost. After the suspended-material particles have largely been removed from the pressurised water, in the following steep section of the line the drop height can be fully utilised to produce energy in the hydroelectric power plant.

Studies have shown that reliable removal of the suspended-material particles with little pressure loss can be achieved in the pressurised water line if the length of the flow channel between an inlet for the water flow with the suspended-material particles and an outlet for the water flow essentially cleaned of the suspended-material particles is between 5 m and 25 m and the difference in height between the inlet and outlet is between 1 m and 15 m.

In terms of a durable and reliable, low-wear design it is of advantage if the swirl-generating device is an insert element which is arranged preferably centrally in the tubular element and on the surface of which there are deflection means for deflecting the fluid flow flowing along the deflection means perpendicularly with regard to the main flow. The deflection means allow fully passive swirling of the pressurised water in that they define a flow path perpendicular to the main flow direction.

In order to avoid turbulence in the pressurised water line and to thereby keep the pressure loss due to the device to a minimum, it is advantageous if the insert element has an end section facing the inlet and an end section facing the outlet which each taper in cross-section towards the free end, as well as a middle deflection section with the deflection means with an essentially constant cross-section. The approximately streamlined, for example, ellipsoid shape of the insert element allows losses in the flow energy due to friction, turbulence etc. or a reduction in pressure to be kept to a minimum.

In order to guarantee the flow component and thus the reliable removal of the suspended-material particle at a comparatively low flow rate of the water flow of approximately 3 m/s, it is beneficial if the tubular element has at least two sections with different, essentially constant cross-sections, whereby the ratio of the cross-section area of the sections is preferably between 2.5:1 and 1.5:1, more particularly essentially 2:1. The flow component perpendicular to the main component brought about by the swirl-generating device is then led into a section with a reduced cross-section in which in accordance with the principle of rotary pulse constancy the velocity component of the water flow perpendicular to the main flow direction, and thereby the centrifugal effect on the suspended-material particles is increased accordingly. This has the advantage that with the swirl-generating device only a comparatively weak flow component perpendicular to the main flow direction has to be stimulated, which then on entry to the section with the reduced cross-section is strengthened in such a way that a centrifugal force expedient for removing the suspended-material particles acts on the suspended-material particles. As the requirements for the magnitude of the flow component generated by the swirl-generating device perpendicularly to main flow are comparatively low, the pressure loss at the swirl-generating device can be kept to a minimum.

In order to prevent the occurrence of turbulence in the transition between the sections of the flow channel with different cross-section areas it is beneficial if between the two sections with an essentially constant cross-section, the tubular element has a reducing section in which the tubular element has a cross-section area which gradually reduces in the direction of the main flow.

In order to avoid cavitation in the water flow it is of advantage if the tubular element narrows in the reducing section surrounding the end section of the insert element in such a way that that the cross-section area of the flow channel remains essentially constant. Advantageously the cross-section area of the flow reduces slightly in the direction of the deflection section; this ensures that flow separation from the inner element only takes place at the end of the insert element which further reduces the energy losses.

Studies have shown that the water flow can be directed through the reducing section without cavitation and with low pressure losses if in the reducing section the tubular element essentially narrows in accordance with a polynomial of the order n, preferably of the order 5.

In terms of a structurally simple, expedient design of the deflection means it is advantageous if the deflection means are provided with at least six, preferably eight, blades. The blades are preferably arranged at regular intervals on the surface of the insert element in order to allow even deflection of the water flow over the entire cross-section of the flow channel.

To assure a laminar flow, or in the case of greater flow velocities a turbulent, directed flow along the blades, it is advantageous if the blades are curved, at least in parts.

Surprisingly it has been found that the pressure loss along the middle deflection system with the deflection means can be considerably reduced if the blades are curved in accordance with a Bézier curve of the order of n, preferably the order of 3. Advantageously the mid-line of the blades can be specifically adapted to the given conditions in that corresponding parameter values are predetermined for the Bézier curves.

To stimulate the flow component perpendicular to the main flow direction it is expedient if the blades bring about a deflection about a deflection angle of at least 60°, preferably between 65° and 73°.

In order to allow as much removal of the suspended-material particles from the water flow as possible, it is beneficial if the separating device has at least one funnel-like separation element adjoining the tubular element with a separating channel connected to the flow channel.

To reduce the occurrence of turbulence when removing the suspended-material particles it is beneficial if a longitudinal axis of the separating channel is essentially arranged in a tangential plane of the tubular element, preferably at an angle of 30° to 70°, more particularly 45° to 55° in relation to the main flow direction. Through the tangential removal the disruptive influence of the separating device on the flow in the pressurised water line is largely eliminated. In practice is has proven to be particularly advantageous if the separating channel is arranged twisted in the tangential plane at an angle of, in particular, approximately 50° in relation to the main flow direction or longitudinal axis of the tubular element.

In order to be able to reliably remove the suspended-material particles into the separating channel, it is advantageous if at least one guide wing or guide curve is provided in the flow channel, running essentially from the middle of the flow channel to the separating channel. Accordingly the guide wing assists the removal of the suspended-material particles in that the suspended-material particles concentrated radially outwards by the stimulated perpendicular flow component are guided into the separating channel.

To keep the resistance to the water flow and thereby the losses due to turbulence etc. to a minimum, it is advantageous if a curvature of the guide wing or guide curve essentially corresponds with the velocity vector of swirled suspended particles.

To ensure the removal of the suspended-material particles in a comparatively short pipe section it is beneficial if the tubular element has at least two diametrically opposite longitudinal slits, whereby each slit is connected with a separating channel of a separating element. Of course it is also conceivable, depending on the given conditions of the pressurised water line, such as the flow velocity, diameter etc., to provide more than two longitudinal slits in the tubular element to each of which a separating element is assigned via which the suspended-material particles are removed.

In the method of the type set out in the introduction the water flow with the suspended-material particles is passively deflected in a direction perpendicular to the main flow direction so that a flow component of the water flow running perpendicularly to the main flow direction is stimulated and the suspended-material particles carried radially outwards by the centrifugal force are removed from the pressurised water line. With the method in accordance with the invention the same advantages are thus achieved as with the device in accordance with the invention in the form of an axial cyclones, so that in order to avoid repetition reference is made to the above embodiments.

The invention will be described in more detail below with the aid of the preferred examples of embodiment show in the drawing, to which it should not, however, be limited. In detail, in the drawing.

Figure 15:
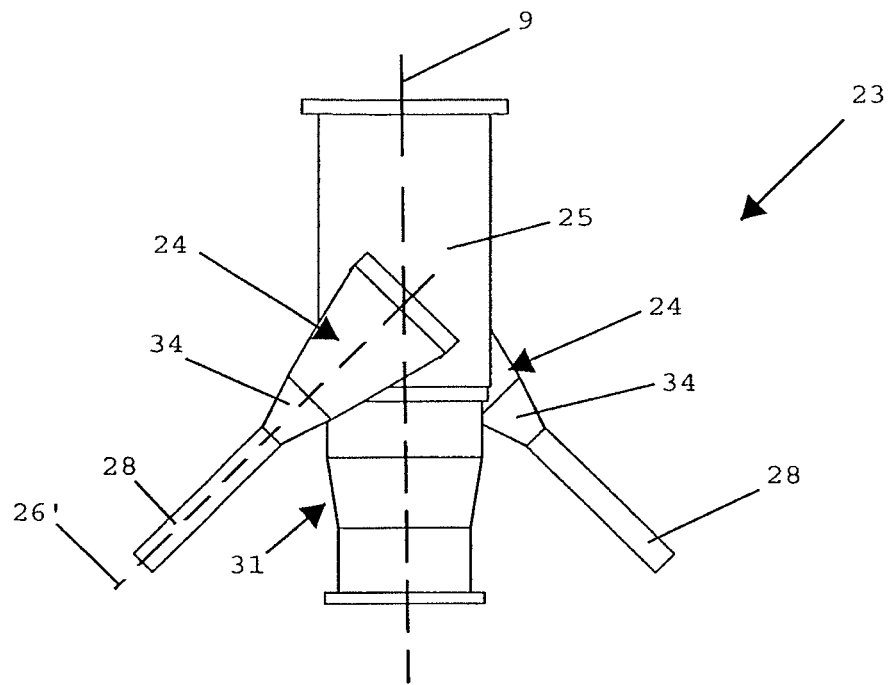
Figure 16:
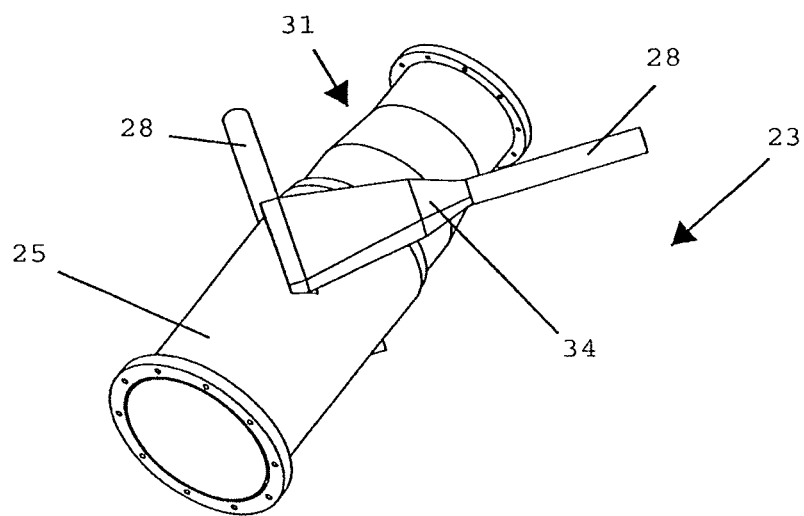
Figure 17:
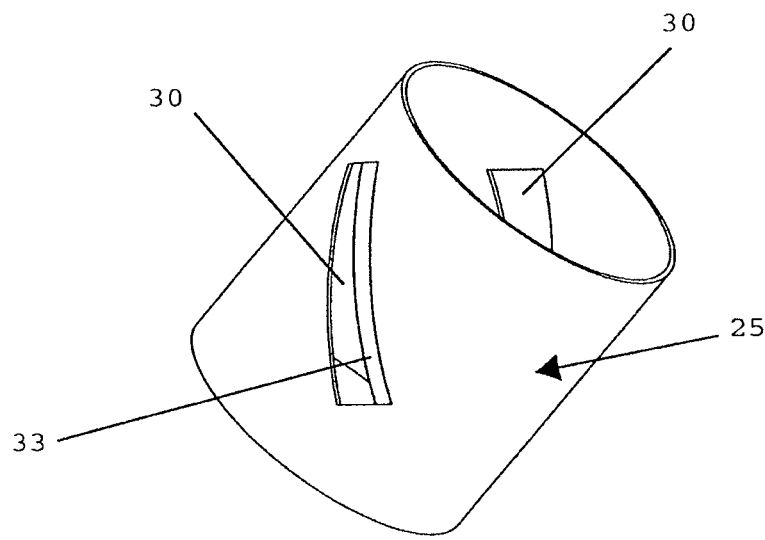
Figure 18:
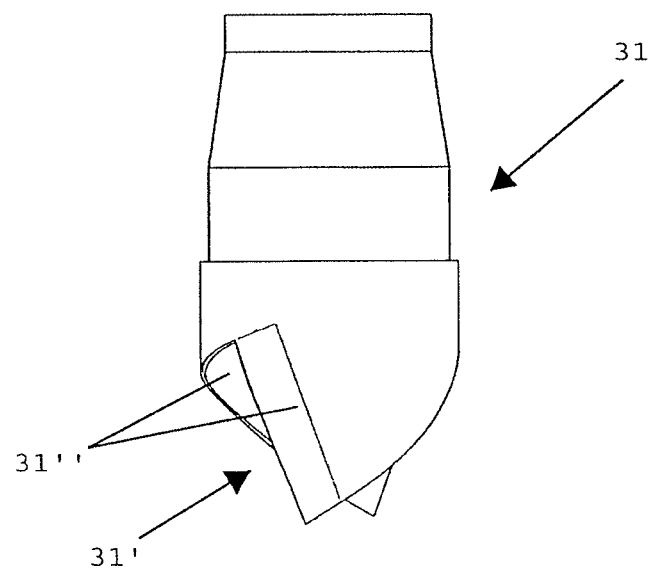

FIG. 15 and FIG. 16 each show a view of an alternative embodiment of the end section, in which the longitudinal axis of the separating channel is inclined in the tangential plane of the tubular element in relation to the main flow direction;

FIG. 17 shows the separating segment of the end section in accordance with FIGS. 15 and 16; and FIG. 18 shows the end segment of the end section 23 in accordance with FIGS. 15 and 16.

Figure 1:
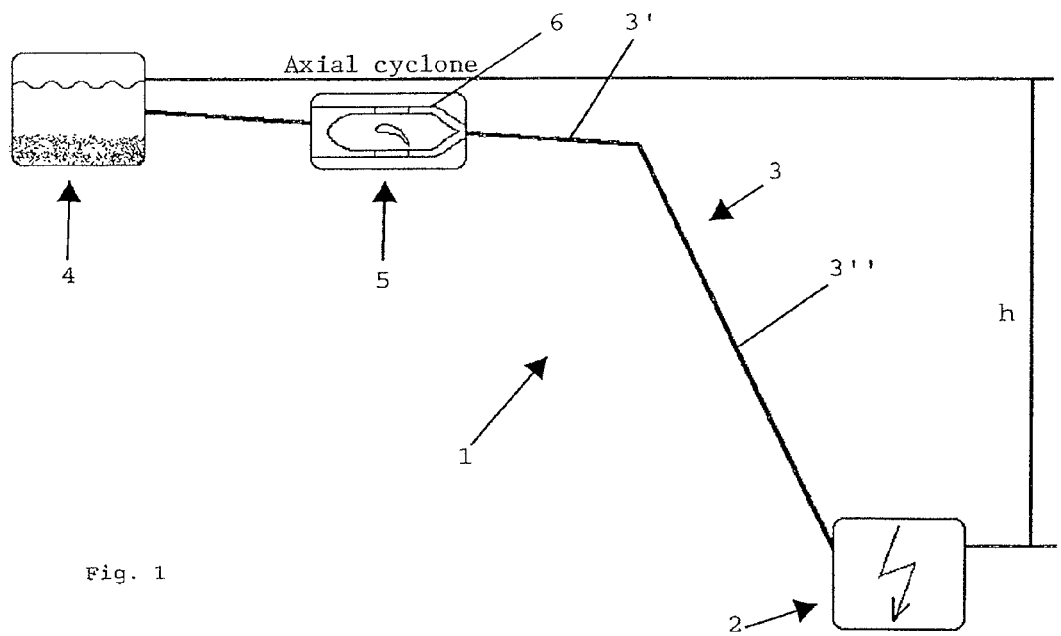
FIG. 1 shows a schematic view of a hydroelectric power plant in which a device for removing suspended-material particles in a pressurised line is provided.

FIG. 1 schematically shows a hydroelectric power plant 1 with which hydraulic energy is converted in the conventional way into electricity. A hydroelectric power plant 2 is connected with a pressurised water line 3 which is fed from a reservoir in which the water is retained at a high potential level, whereby the pressurised water line 3 in the shown example of embodiment has two sections 3', 3" with different gradients. The pressurised water line 3 can be connected directly to the water of the reservoir or, as indicated schematically in FIG. 1, with a conventional de-sanding settlement basis 4 for removing coarser solid such as gravel, sand particles etc. When the sluices or shut-off elements of the reservoir are opened the water flows down via the pressurised water line 3, and in accordance with a drop height h gains flow energy which can then be used to operate a turbine provided in the hydroelectric power plant. Disadvantageously, the flow of water in the pressurised water line 3 can, even after the de-sanding settlement basin and more particularly if such a de-sanding settlement basis is dispensed with, can carry with it a high content of sediments or suspended-material particles, i.e. solid substances such as glacier silt, find sand particles and suchlike, which cause considerable wear on the rotating parts of hydroelectric power plant 2. In order to remove the suspended-material particles from the water flow before the water flow reaches the wear-susceptible components of the hydroelectric power plant 2, in accordance with the invention a device for removing suspended-material particles, more particularly fine and ultra-fine particles is arranged in the pressurised water line 3.

The device 5, which is only shown schematically in FIG. 1 has a tubular element 6, which is connected to the pressurised water line on its inlet and outlet side. Every additional device included in the pressurised water line 3 necessarily increases the flow resistance of the water flow which results in a pressure loss in the pressurised water line 3 or a reduction in the usable drop height h. In order to keep the pressure loss occurring in the pressurised water line 3 while the water is flowing through the device to a minimum, the device 5 or the tubular element 6 is provided in the section 3' of the pressurised water line 3 with a comparatively small gradient. Accordingly in section 3' only a small drop height h is overcome; the predominant proportion of the flow energy will then be obtained in the subsequent section 3" in which the water flow covers the majority of the drop height h to the hydroelectric power plant 2. Studies have shown that a large part of the suspended-material particles can be very effectively removed by way of the device in accordance with the invention with little pressure loss, even if the section 3' of the pressurised water line 3, in which the device 5 for removing the suspended-material particles is arranged only has a gradient of between 0.1% and 0.5%.

Figure 2:
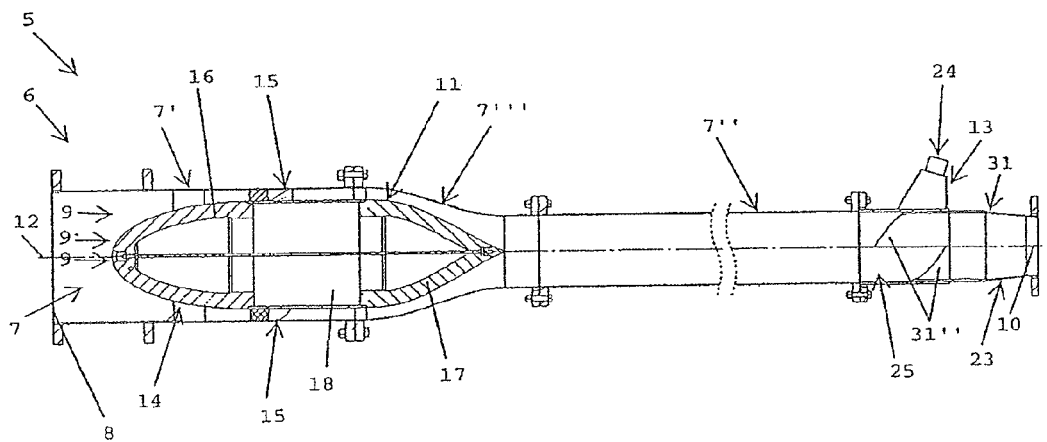
FIG. 2 shows a longitudinal cross-section of a tubular element of the device in accordance with FIG. 1 which forms a flow channel.

FIG. 2 shows a longitudinal section through the tubular element 6 of the device 5 for removing suspended-material particles from the pressurised water line 3 of the hydroelectric power plant 1. Inside the tubular element 6 there is a flow channel 7 in which the water flow is guided. The water flow with a relatively high content of suspended-material particles is taken via an inlet 8 into the flow channel 7 the longitudinal extent of which determines a main flow direction 9 of the water flow indicated with arrows in FIG. 2. On entering the device 5 the suspended-material particles are usually homogeneously distributed over the cross-section area of the water flow. At an outlet 10 water flow with a low proportion of suspended-material particles is drawn off which can then be supplied to the hydroelectric power plant 2. In the flow channel 7, in terms of a structural design of the device 5 in the form of an axial cyclone, a stationary, passive swirl-generating device 11 is provided with which a flow component perpendicular to the main flow direction 9 of the water flow is stimulated, i.e. the water flow is swirled around middle axis 12 of the flow channel 7. The swirled suspended-material particles are exposed to a centrifugal force directed radially outwards perpendicularly to the middle axis 12. Due to the effect of the centrifugal force there is a concentration gradient in the radial distribution of the suspended-material particles, whereby the suspended-material particles become more concentrated in the flow channel 7 with increasing distance from the middle axis 12. A partial flow of the water flow with a high content of suspended-material particles flowing along the tubular element 6 is removed from the flow channel 7 by means of a separating device 13.

As a swirl-generating device 11 an insert element 14 is provided which is arranged in the flow channel 7. On the surface of the insert element 14 deflection means 15 are provided, with which the water flow along the deflection means is deflected perpendicularly to the main flow direction 9. The swirling of the water flow and the suspended-material particles contained therein takes place without movable, more particularly rotating components. The external shape of the deflection means 15 brings about a flow path which is perpendicular to the main flow direction 9, so that after passing the insert element 12, in addition to the flow component in the main flow direction 9, the water flow also has a flow component perpendicular thereto.

Figure 3:
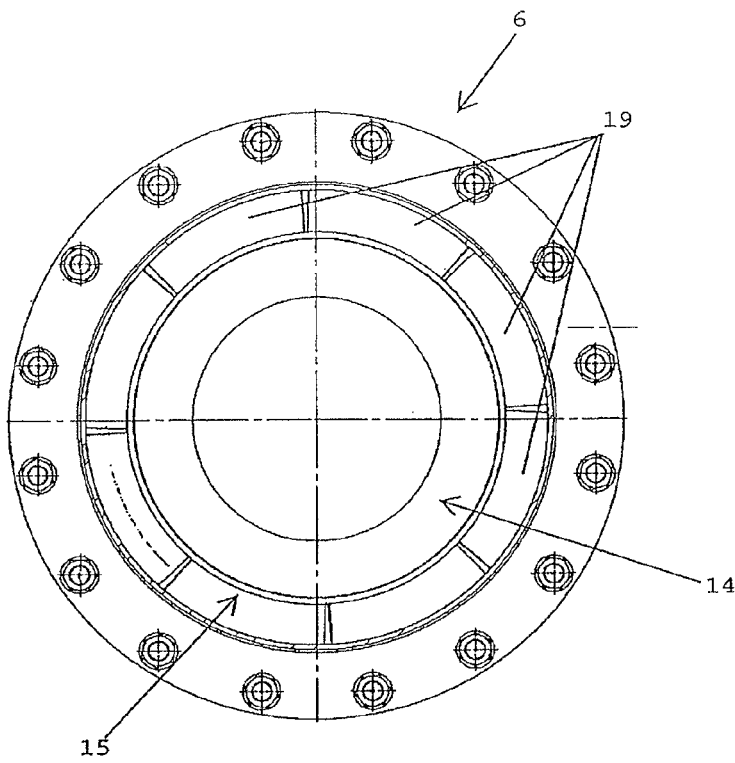
FIG. 3 shows a cross-section through the tubular element in accordance with FIG. 2 in the area of an insert element arranged in the flow channel on which deflection means for swirling the suspended-material particles are provided.
Figure 4:
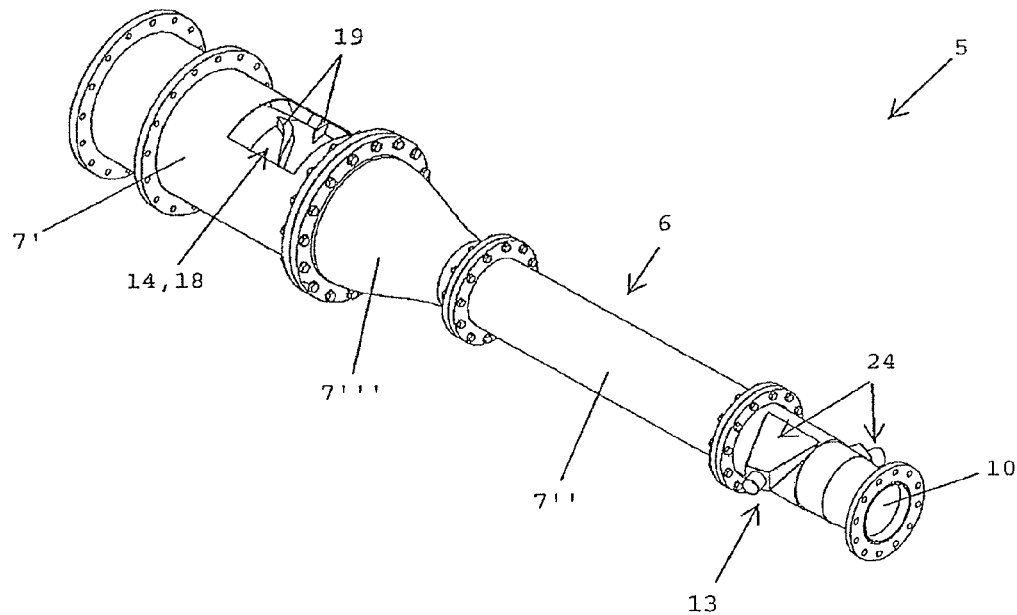
FIG. 4 shows a perspective view of the device which is partially broken open in the area of the deflection means.

In the shown example of embodiment of the invention the insert element 14 has three sections or parts 16, 17, 18 which in the assembled state are rigidly connected to each other. An end section 16 facing the inlet 8 and end section 17 facing the outlet 10 each narrow in cross-section towards their free end; advantageously the approximately streamlined, generally ellipsoid shape of the insert element 14 only exhibits very low flow resistance. Between the end sections 16, 17 there is an essentially cylindrical middle deflection section 18 of constant cross-section. On the surface of the middle deflection section 18 there are several, in the case of the shown example eight, deflection means in the form of blades 19. The radial extent of the middle deflection section 18 with the blades 19 corresponds to the inner diameter of the tubular element 6 so that the entire water flow is forces to pass the blades 19. As can be seen from the cross-section view in accordance with FIG. 3 and/or the perspective view in accordance with FIG. 4 the blades 19 are provided at regular angular distances on the surface of the deflection section 18.

Figure 5:
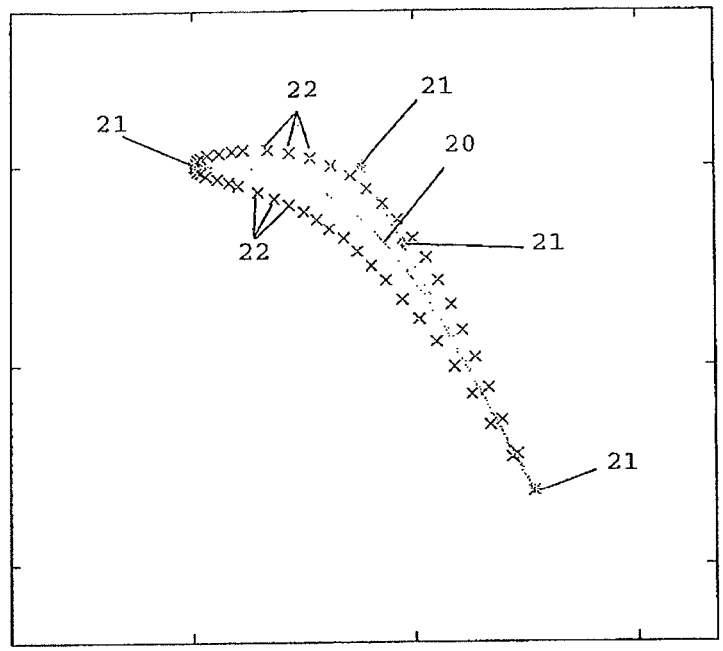
FIG. 5 shows a schematic view in which the profile of the deflection blades provided on the insert body is visible.

In order to optimise the flow along the blades 19 the blades have an arc-shaped curvature. FIG. 5 schematically shows the cross-section profile of the blades 19 adapted with the aid of computer simulations. A mid-line 20 of the profile is curved in accordance with a third-order Bézier curve. Starting from the mid-line 20, with the aid of Bézier support points 21 data points 22 are calculated for the curvature of the side edges/side surface of the blades 19 optimised in terms of the flow properties. The illustrated blade profile brings about a deflection of the water flow by a deflection angle of approximately 65° measured with regards to the main flow direction 9.

Due to the relative low flow velocity of the water flow in section 3' of the pressure device the centrifugal force acting on the suspended-material parties is also relatively low, to increase the swirling brought about by the deflection means 15, the tubular element 6 has two sections 7', 7" with different cross-sections. A first section 7' which contains end section 15 facing the inlet 8 or the middle deflection section 18 of the insert element 14, has a larger cross-section area than a second section 7", in which the separating device 13 is provided. In the tested model a diameter of approximately 44 cm in section 7' and of approximately 22 cm in section 7" has proven to be advantageous. The dimensions used in a real power plant can of course exceed these dimensions. The ratio of the cross-section areas of the sections 7', 7" is approximately 2:1. The preferred total length of the element 6 is at least 3-4 m, whereby in the insert element in this case has a length of approximately 1 m.

In the first section 7' a perpendicular flow component is stimulated by the deflection means 15; on the basis of the principle of angular momentum conservation, a reduction in the diameter bring about a corresponding increase in the velocity of the fluid flow perpendicularly to the main flow direction 9. The transition between the sections 7', 7" of different cross-section areas takes place in a reducing section 7''' of the tubular element 6 of flow channel 7 adjoining the deflection section 18 of the insert element 14 in the main direction of flow 9. The cross-section of the tubular element 6 reduces continuously in the reducing section 7''' starting from the cross-section of section 7' towards the reduced cross-section of section 7". The end section 17 of the insert element 14 facing the outlet is in the reducing section 7''', wherein the tubular element 6 in the reducing section 7''' surrounding the end section 17 of the insert element 14 narrows in such a way that the cross-section area of the flow channel 7 free of the insert element 14 remains essentially constant; as a result of this, as has been shown by simulations, cavitation can be prevented. As can be seen in FIG. 2 the cross-section area of the flow channel 7 left free of the insert element 14 widens slightly in the main flow direction 9 in the reducing section 7''' which allows optimum transition of the water flow in section 7" with the reduced cross-section largely without loss-associated turbulence. The contour of the tubular element 6 in the reducing section 7''' follows a $5^{th}$ order polynomial.

The separating device 13 for removing the swirled suspended-material particles from the flow channel 7 is provided in section 7" of the flow channel 7 on a separate end section 23 of the tubular element 6 which in the assembled state is rigidly connected to the other components of the tubular element 6.

Figure 6:
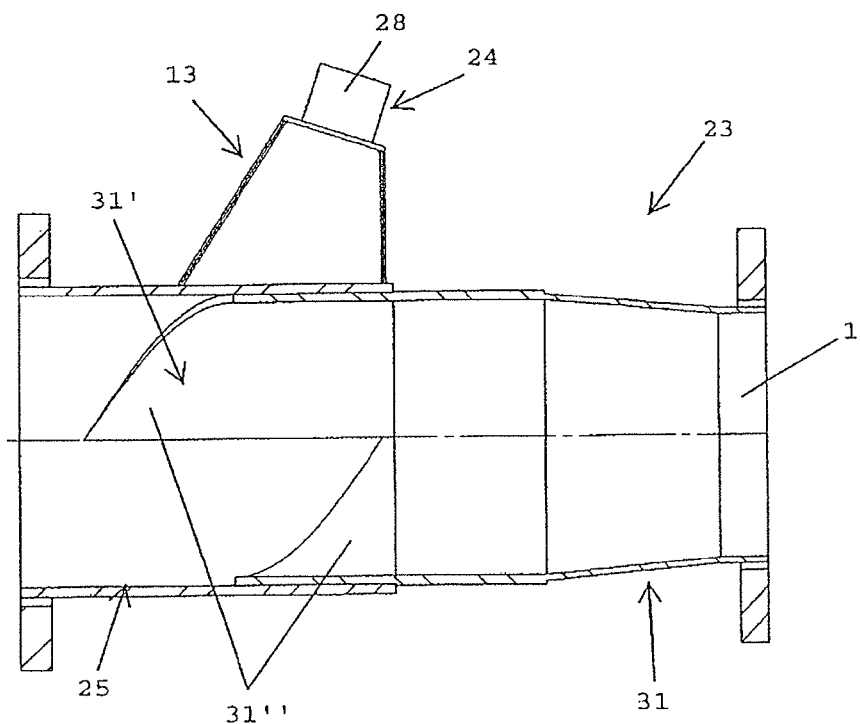
FIG. 6 shows a detailed view of an end section of the tubular element in accordance with any one of FIGS. 2 to 4, whereby the end section has a separating device for removing suspended-material particles carried radially outwards though the effect of centrifugal force.
Figure 7:
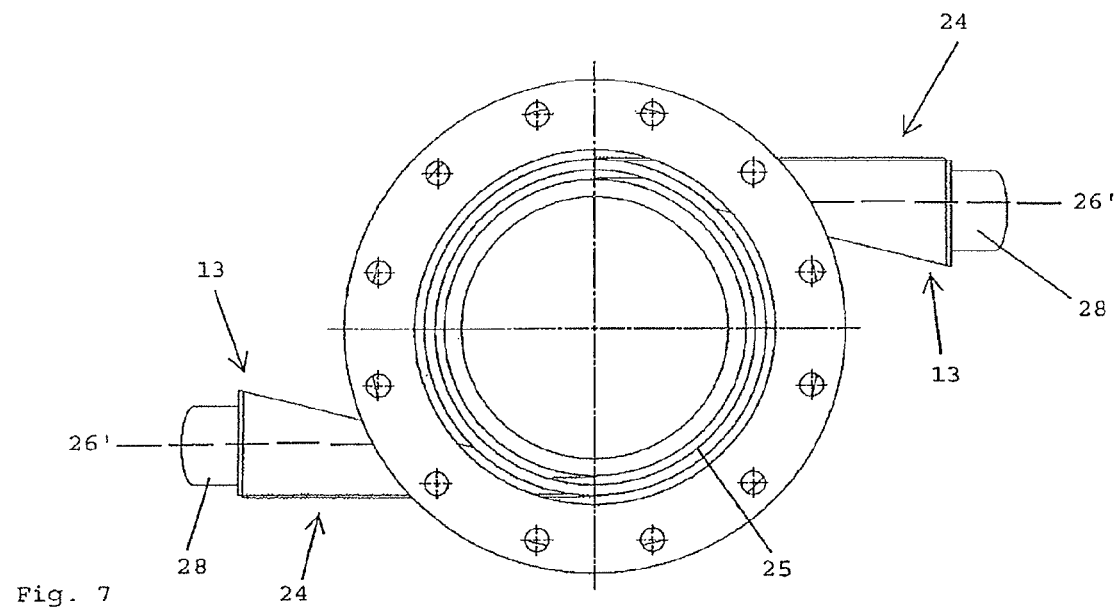
FIG. 7 shows a view onto the end section of the tubular element in accordance with FIG. 6.
Figure 8:
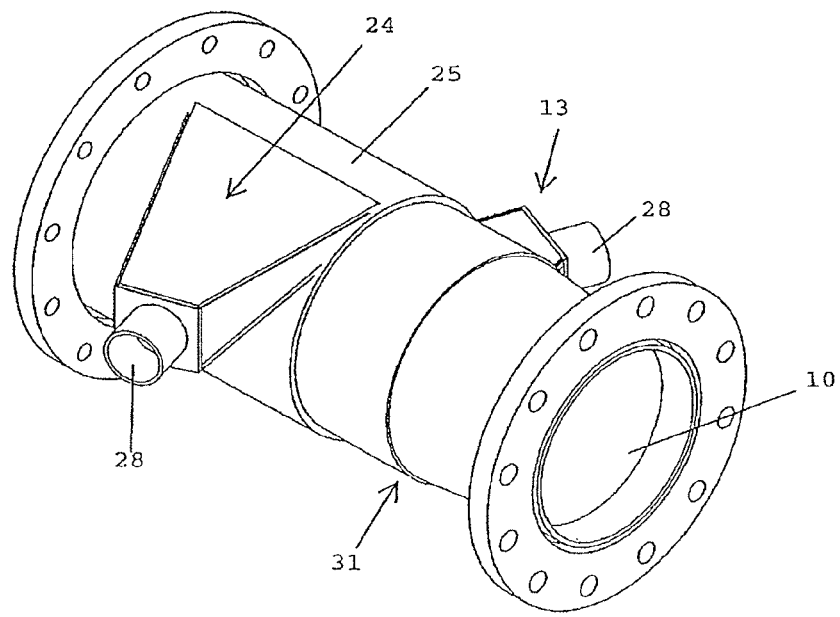
FIG. 8 shows a perspective view of the end section in accordance with FIGS. 6 and 7.

FIGS. 6 to 8 each show a view of the end section 23. According to these the separating device 13 has two funnel or shaft-like separating elements 24 adjoining the tubular element 6 which externally are fastened to a separating segment 25 of the end section 23 shown in FIG. 12. Inside each of the separating elements 24 there is a separating channel 26 which is connected to the flow channel 7. As can be seen in FIG. 7 in particular, the separating element 24 tangentially adjoins the separating segment 25 of the end section 23, whereby in the example of embodiment shown in FIGS. 1 to 14 a longitudinal axis 26' of the separating channel 25 is arranged perpendicularly to the main flow direction 9. In this way removal of the suspended-material particles can take place essentially perpendicularly to the main flow direction 9, whereby increases in efficiency can be achieved compared with separation in the main flow direction 9.

Figure 9:
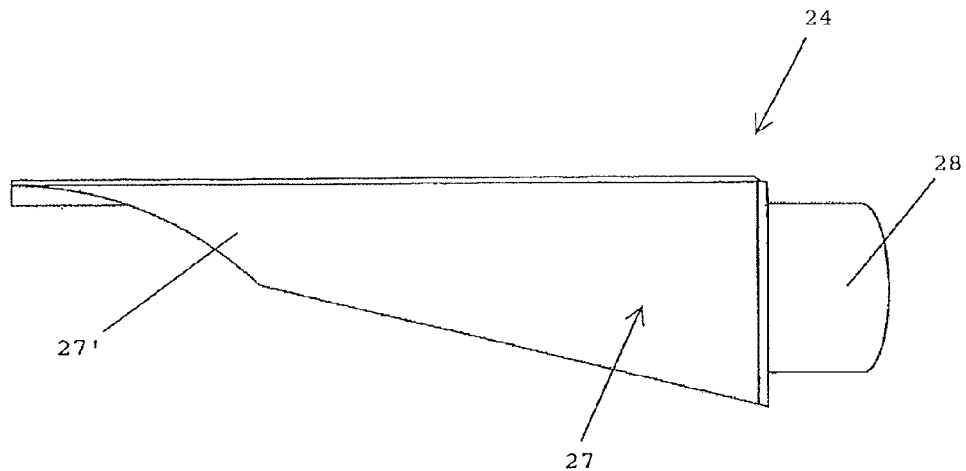
FIGS. 9 to 11 show a side view, a top view and a perspective view of the separating element in accordance with FIGS. 6 to 8.
Figure 10:
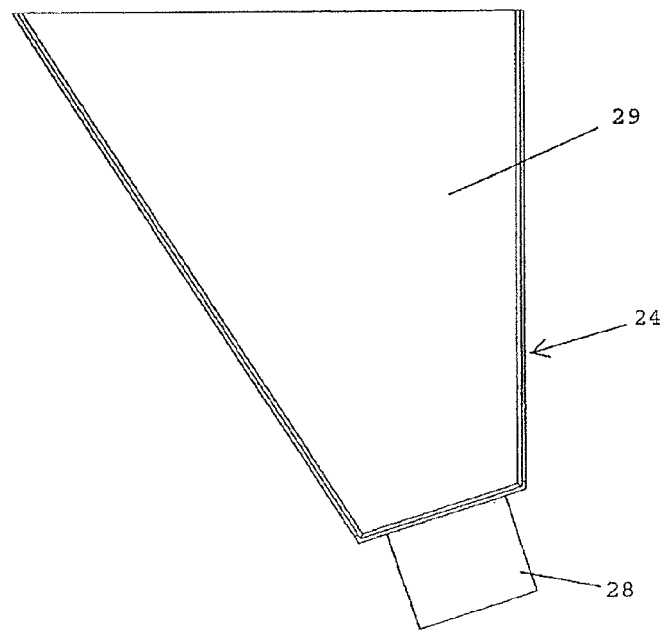
Figure 11:
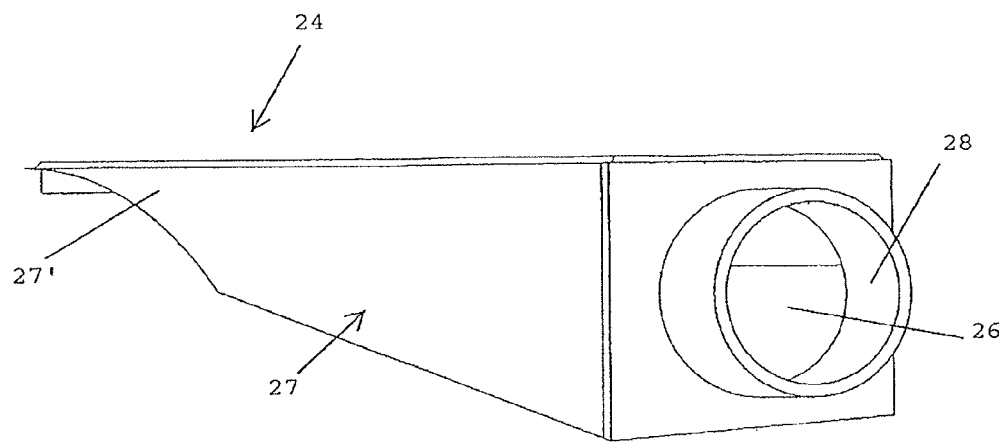

FIGS. 9 to 11 each show a detailed view of the separating element 24. The side walls 27 of the separating element 24 each have support surfaces 27' curved in accordance with the outer curvature of the tubular element 6, which in the assembled state of the device 1 adjoin the separating segment 25. On the front of the separation element 24 there is a removal connection 28 with which the suspended-material particles-water mixture can be removed/disposed of. The removal connection 28 has an external thread which can be connected with a corresponding removal line (not shown in the figure). As can be seen in FIG. 10 the upper wall 29 of the separating element 24 narrows in the direction of the removal connection 28.

Figure 12:
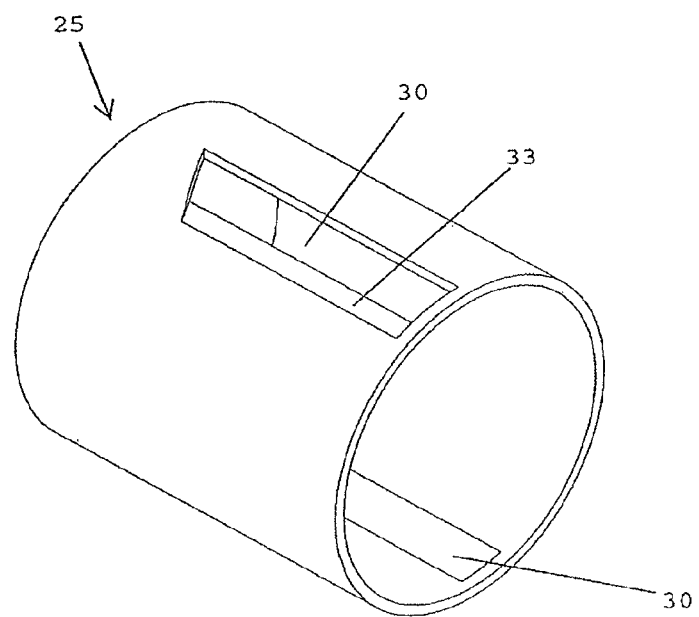
FIG. 12 shows a perspective view of a separating segment of the end section in which two longitudinal slits are provided for connection to the separating channels of the separating elements.

FIG. 12 shows the separating segment 25 of the end section 23 which has two longitudinal slits arranged essentially offset by 180° or opposite each other, which in the assemble state of the device 5 are each arranged on a separating channel 26 of a separating element 24. The quantity of suspended-material particles-water mixture can be simply regulated by changing the dimensions of the longitudinal slits 30, more particularly the slit width.

Figure 13:
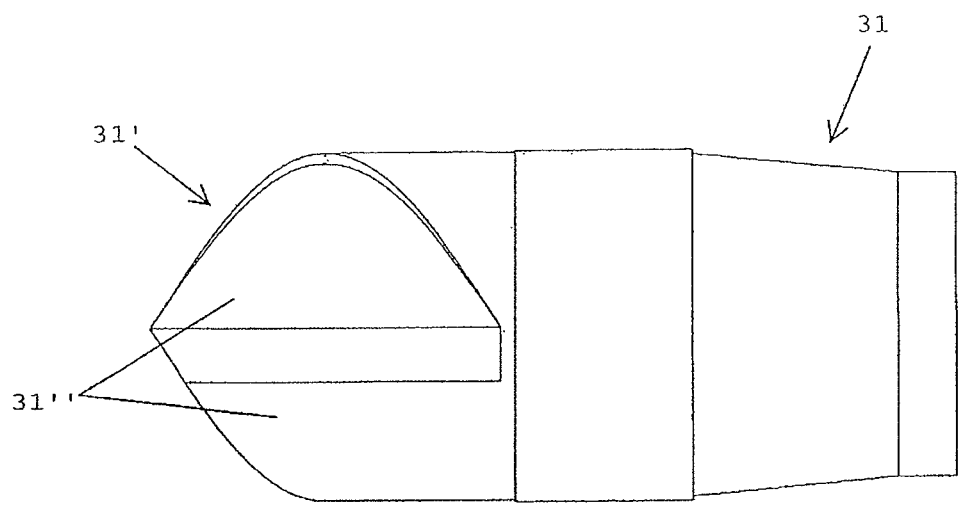
FIG. 13 shows a side view of an end segment of the end section, whereby in the assembled state a free end of the end segment inserted into the separating segment has guide wings for the swirled water flow.
Figure 14:
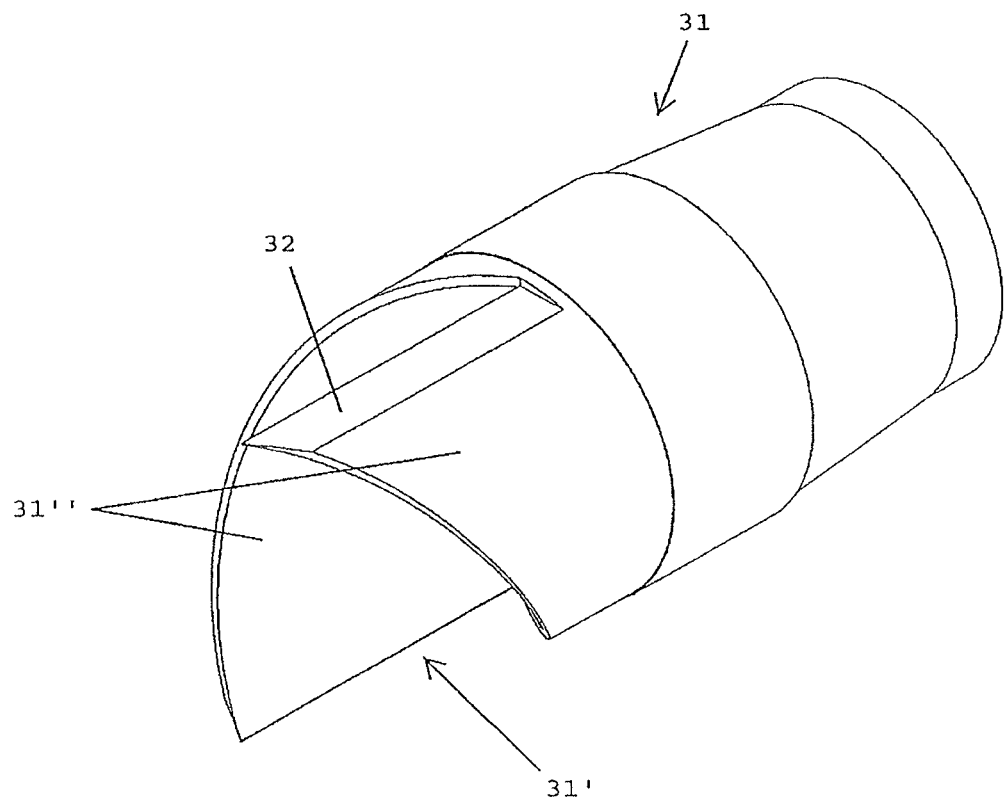
FIG. 14 shows a perspective view of the end segment in accordance with FIG. 13.

Adjoining the separating segment 25 the end section 23 has an end segment 31 which is shown in a side view in FIG. 13 and perspectively in FIG. 14. In the assembled state of the end section 23 a free end 31' of the end segment 31 facing away from the outlet 10 is pushed into the separating element 25 and held rigidly on the separating segment 25 as can be seen in FIG. 6. The free end 31' of the end 31 has two guide wings 31" which extend essentially from the middle of the flow channel 7 to a longitudinal slit 30 or a separating channel 26 of a separating body 24. The curvature of the guide wings 31" essentially corresponds with the velocity vector of the swirled suspended-material particles, which allow expedient guiding of the water flow with low flow energy losses. The guide edges 32 of the guide wings 31" like the edges 33 of the longitudinal slit 30 adjoining the guide edges 32 in the assembled state of the end section 23 are sloped (cf. FIG. 12) in order to facilitate the removal of the suspended-material particles.

In FIGS. 15 to 18 an especially preferred form of embodiment of the end section 23 is shown.

As can be seen in particular in FIG. 16 and FIG. 16, the longitudinal axis 26' of the separating channel 26 essentially extending in the tangential plane of the tubular element 6 is arranged at an angle of approximately 50° to the main flow direction 9, as a result of which very efficient removal of the suspended-material particles can be achieved. In addition, between the shaft-like separating element 24 and a comparatively elongated removal connection 28 a connection piece 34 is provided which narrows in the longitudinal direction and which essentially continues the separating element 24. In this way the flow conditions at the transition from the separating element 24 into the removal connection 28 can be considerably improved.

In FIG. 17 the separating segment 25 of the end section 23 is show, which has a longitudinal slit 30 extending in accordance with the angled arrangement of the separating channel 26.

FIG. 18 shows the end segment 31 of the end section 23 which allows efficient guiding of the flow in the direction of the separating channel 26.

The invention claimed is:

1. A device for removing suspended-material particles from water containing suspended-material particles in a pressurized water line having a flow direction during use of a hydroelectric power plant wherein:
   the pressurized water line comprises at least two sections of different gradient, further defined as comprising a steep section in the flow direction that adjoins a flat section;
   a tubular element forming a flow channel is comprised in the flat section of the pressurized water line, with the flow channel essentially extending in an axial direction of the pressurized water line;
   a stationary swirl-generating device adapted to swirl the water containing suspended-material particles is comprised in the flat section; and
   a separating device adapted to remove the swirled suspended-material particles is provided.

2. The device of claim 1, wherein the length of the flow channel between an inlet for the water flow with the suspended-material particles and an outlet for a water flow essentially cleared of the suspended-material particles is between 5 m and 25 m, and the difference in height between the inlet and outlet is between 1 m and 15 m.

3. The device of claim 1, wherein the stationary swirl-generating device comprises an insert element with a deflection means for deflecting the water containing suspended-material particles along the deflection means perpendicular to the flow direction.

4. The device of claim 3, wherein the insert element is arranged centrally in the tubular element.

5. The device of claim 3, wherein the insert element has an end section facing the inlet and an end section facing the outlet, which each taper in cross-section towards the free end, as well as a middle deflection section with the deflection means and with an essentially constant cross-section.

6. The device of claim 5, wherein the tubular element has at least two sections with different, essentially constant cross-section areas, wherein a ratio of the cross-section areas of the at least two sections is between 2.5:1 and 1.5:1.

7. The device of claim 6, wherein the ratio of the cross-section areas of the at least two sections is essentially 2:1.

8. The device of claim 6, wherein between the at least two sections with an essentially constant cross-section, the tubular element has a reducing section in which the tubular element has a cross-section area which gradually reduces in the main flow direction.

9. The device of claim 8, wherein in the reducing section surrounding the end section of the insert element, the tubular element narrows in such a way that a free cross-section area of the flow channel remains essentially constant.

10. The device of claim 8, wherein in the reducing section, the tubular element tapers in accordance with a polynomial of order n.

11. The device of claim 10, wherein the tubular element tapers in accordance with a polynomial of order 5.

12. The device of claim 1, wherein the stationary swirl-generating device comprises at least 6 blades.

13. The device of claim 12, wherein the stationary swirl-generating device comprises 8 blades.

14. The device of claim 12, wherein the at least 6 blades have an arc-shaped curvature at least in parts.

15. The device of claim 14, wherein the at least 6 blades have Bézier curve of the order of n.

16. The device of claim 15, wherein n is three.

17. The device of claim 12, wherein the at least 6 blades bring about a deflection angle of at least 60°.

18. The device of claim 17, wherein the at least 6 blades bring about a deflection angle between 65° and 73°.

19. The device of claim 1, wherein the separating device has at least one funnel-like separating element adjoining the tubular element, and the at least one funnel-like separating element has a separating channel connected to the flow channel.

20. The device of claim 19; wherein a longitudinal axis of the separating channel is essentially arranged in a tangential plane of the tubular element at an angle of 30° to 70° in relation to the flow direction.

21. The device of claim 20; wherein a longitudinal axis of the separating channel is essentially arranged in a tangential plane of the tubular element at an angle of 45° to 55° in relation to the flow direction.

22. The device of claim 19, wherein in the flow channel at least one guide wing is provided which essentially runs from the middle of the flow channel to the separating channel.

23. The device of claim 22, wherein a curvature of the guide wing essentially corresponds to a velocity vector of the swirled suspended-material particles.

24. The device of claim 19; wherein the separating device has two funnel-like separating elements with two respective separating channels, the tubular element has two diametrically opposite longitudinal slits, and each one of the two respective separating channels is connected to one of the two diametrically opposite longitudinal slits.

25. A method comprising:
obtaining a device for removing suspended-material particles from water containing suspended-material particles in a pressurized water line having a flow direction during use of a hydroelectric power plant wherein:
the pressurized water line comprises at least two sections of different gradient, further defined as comprising a steep section in the flow direction that adjoins a flat section;
a tubular element forming a flow channel is comprised in the flat section of the pressurized water line, with the flow channel essentially extending in an axial direction of the pressurized water line;
a stationary swirl-generating device adapted to swirl the water containing suspended-material particles is comprised in the flat section; and
a separating device adapted to remove the swirled suspended-material particles is provided; and
using the device to remove the suspended-material particles from the water containing suspended-material particles in the pressurized water line of the hydroelectric power plant.

26. The method of claim 25, wherein the suspended-material particles are sand.

* * * * *

UNITED STATES PATENT AND TRADEMARK OFFICE
CERTIFICATE OF CORRECTION

PATENT NO. : 9,238,234 B2
APPLICATION NO. : 13/574166
DATED : January 19, 2016
INVENTOR(S) : Eduard Doujak et al.

It is certified that error appears in the above-identified patent and that said Letters Patent is hereby corrected as shown below:

Title page

Item (57), Abstract, line 1:

Replace "method or removing" with --method for removing--.

In the claims

Claim 19, column 11, line 1:

Replace "element ,and" with --element, and--.

Signed and Sealed this
Nineteenth Day of July, 2016

Michelle K. Lee
*Director of the United States Patent and Trademark Office*